US012092546B2

(12) United States Patent
Pozzo

(10) Patent No.: US 12,092,546 B2
(45) Date of Patent: Sep. 17, 2024

(54) TIPPED DISC BLADES BALANCING WITH IMPROVED PRODUCIBILITY

(71) Applicant: C.M.T. UTENSILI S.P.A., Pesaro (IT)

(72) Inventor: Piergiorgio Pozzo, Pesaro (IT)

(73) Assignee: C.M.T. UTENSILI S.P.A., Pesaro (IT)

( * ) Notice: Subject to any disclaimer, the term of this patent is extended or adjusted under 35 U.S.C. 154(b) by 333 days.

(21) Appl. No.: 17/524,390

(22) Filed: Nov. 11, 2021

(65) Prior Publication Data

US 2022/0155173 A1 May 19, 2022

(30) Foreign Application Priority Data

Nov. 13, 2020 (IT) .................. 102020000027248

(51) Int. Cl.
*G01M 1/34* (2006.01)
*B23D 61/02* (2006.01)
*B23D 65/00* (2006.01)

(52) U.S. Cl.
CPC ............. *G01M 1/34* (2013.01); *B23D 61/025* (2013.01); *B23D 65/00* (2013.01)

(58) Field of Classification Search
None
See application file for complete search history.

(56) References Cited

U.S. PATENT DOCUMENTS 7,077,006 B2 * 7/2006 Hansen .................. G01M 1/045
73/487

FOREIGN PATENT DOCUMENTS

| CN | 206316464 |   | 7/2017  |
|----|-----------|---|---------|
| CN | 207423448 | * | 5/2018  |
| CN | 208953201 |   | 6/2019  |
| DE | 102018127980 | * | 5/2020 |
| WO | 9529788   |   | 11/1995 |

OTHER PUBLICATIONS

Italian Search Report and Written Opinion dated Jun. 11, 2021, in connection with Italian Application No. IT202000027248 (19 pages).

* cited by examiner

*Primary Examiner* — Brandi N Hopkins
*Assistant Examiner* — Nigel H Plumb
(74) *Attorney, Agent, or Firm* — KLINTWORTH & ROZENBLAT IP LLP

(57) ABSTRACT

A method for balancing disc blades comprising the steps of: determining the initial position of the center of mass of the disc blade to be balanced with respect to its main axis; calculating/determining the number, the position and/or the dimensions of one or more balancing holes eccentric with respect to said main axis and necessary for removing an amount of material sufficient to bring the center of mass of the disc blade at a distance from the main axis lower than a predetermined maximum limit value; and forming said balancing hole or holes on the central disc in an eccentric position with respect to said main axis. The method improves the producibility of disc blades.

17 Claims, 4 Drawing Sheets

TIPPED DISC BLADES BALANCING WITH IMPROVED PRODUCIBILITY

CROSS-REFERENCE TO RELATED APPLICATIONS

This patent application claims priority from Italian Patent Application No. 102020000027248 filed on Nov. 13, 2020, the entire disclosure of which is incorporated herein by reference.

TECHNICAL FIELD

The present invention relates to a method for balancing disc blades and to a machine implementing such method.

More in detail, the present invention relates to a method and to a machine for balancing tipped disc blades. Use to which the description below will make explicit reference without however loosing in generality.

BACKGROUND ART

As it is known, tipped disc blades consist of a flat central disc made of steel, which has a plurality of protruding radial teeth that jut out cantilevered from the perimeter edge of the disc equally angularly spaced to one another, and of a series of high-resistance material inserts or tips that are welded each on the crest of a respective radial tooth so as to form the cutting part of the same tooth.

To avoid undesired vibrations during cutting, at the end of the production process, the best disc blades are subjected to balancing so as to bring the center of mass of the disc blade at its symmetry and rotation axis.

The balancing of disc blades is currently carried out manually by an operator and entails manually removing, through grinding, a thin layer of metal material from the back of some of the teeth of the disc blade, so as to remove the excess material causing the unbalance.

More in detail, the disc blade balancing process requires operators to place the disc blade on a machinery capable of measuring the unbalance of the disc blade after having driven the blade into rotation about its symmetry and rotation axis. Once the disc blade has been analysed, the disc-blade balancing process requires the operator to remove the disc blade from the aforesaid machinery and, then, to use a grinding disc to manually remove a thin layer of material from the back of some given teeth based on their own experience and on the data displayed by the aforesaid machinery.

Finally, the disc-blade balancing process requires the operator to place the disc blade again on the machinery capable of measuring the unbalance of the disc blade, so as to check whether the selective material removal has brought the center of mass of the disc blade at its symmetry and rotation axis.

Clearly the balancing process described above can be repeated several times until the correct balancing of the disc blade is reached, namely until the unbalance measured by means of the machinery complies with a predetermined tolerance threshold.

Unfortunately, the balancing process described above requires a lot of time and the availability of skilled operators, with very high costs that this entails.

Furthermore, the balancing process described above is strongly affected by human errors. As a matter of fact, it often happens that, while grinding the teeth, the operator accidentally remove from the back of the teeth a layer of material thicker that requested, thus jeopardizing the mechanical resistance of the tooth of the disc blade, with the problems that this entails.

A disc blade with weak teeth cannot be sold and, hence, has to be rejected.

DISCLOSURE OF INVENTION

Aim of the present invention is therefore to provide a method and a machine that are capable of speeding up the balancing of the disc blades described above and of making it more economic and precise, overcoming the drawbacks discussed above.

In accordance with these aims, according to the present invention there is provided a method for balancing disc blades as defined in claim 1 and preferably, though not necessarily, in any one of the claims depending on it.

In addition, according to the present invention there is provided a machine for balancing disc blades as defined in claim 11 and preferably, though not necessarily, in any one of the claims depending on it.

Finally, according to the present invention there is provided a disc blade as defined in claim 16 and preferably though not necessarily, in any one of the claims depending on it.

BRIEF DESCRIPTION OF THE DRAWINGS

The invention will now be described with reference to the accompanying drawings showing a non-limiting embodiment thereof, wherein:

FIG. 4 is a front view of a disc blade realize according to the teachings of the present invention; whereas

BEST MODE FOR CARRYING OUT THE INVENTION

Figure 1:
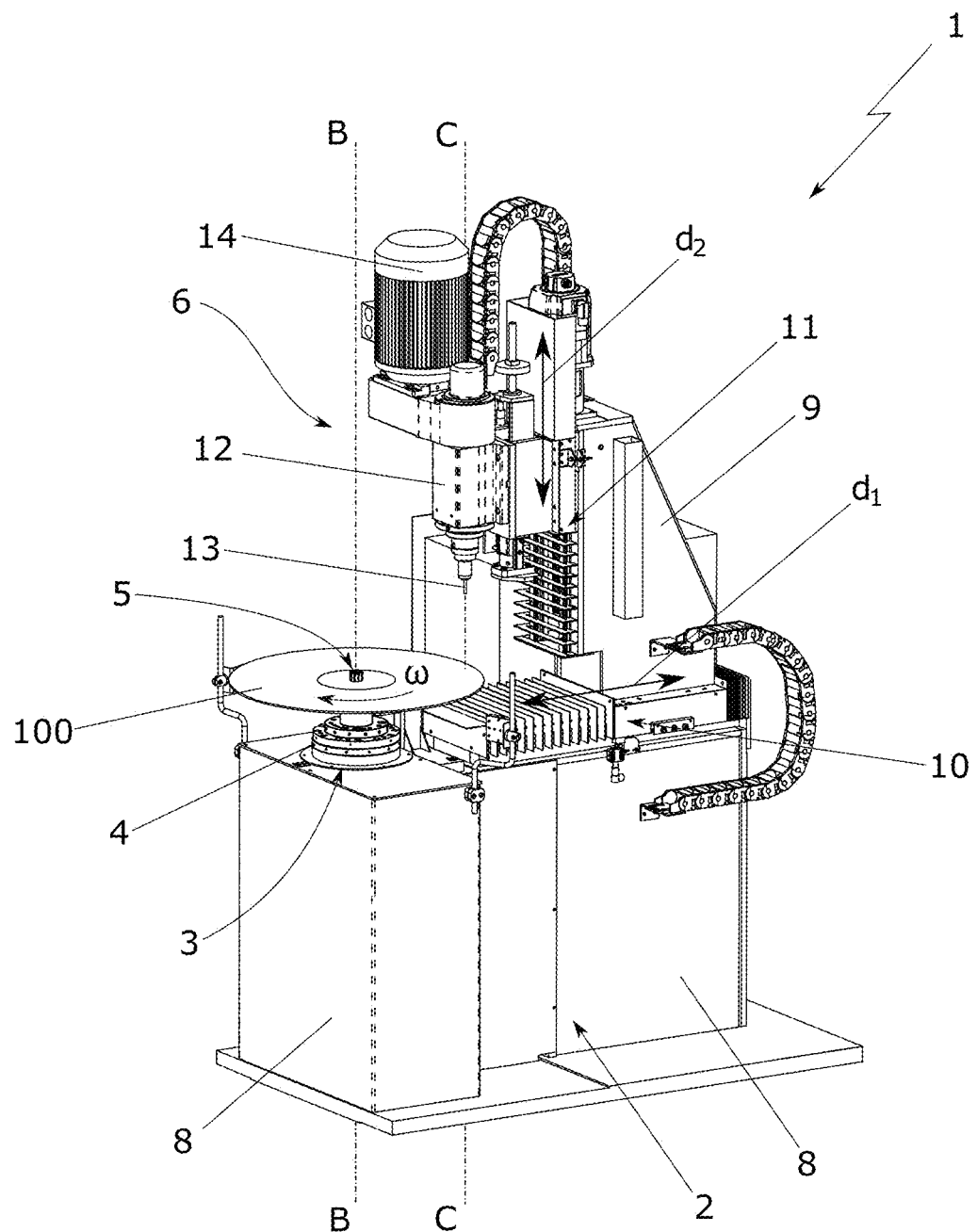
FIG. 1 is a perspective view of a disc-blade balancing machine realized according to the teachings of the present invention, with parts removed for clarity's sake.
Figure 2:
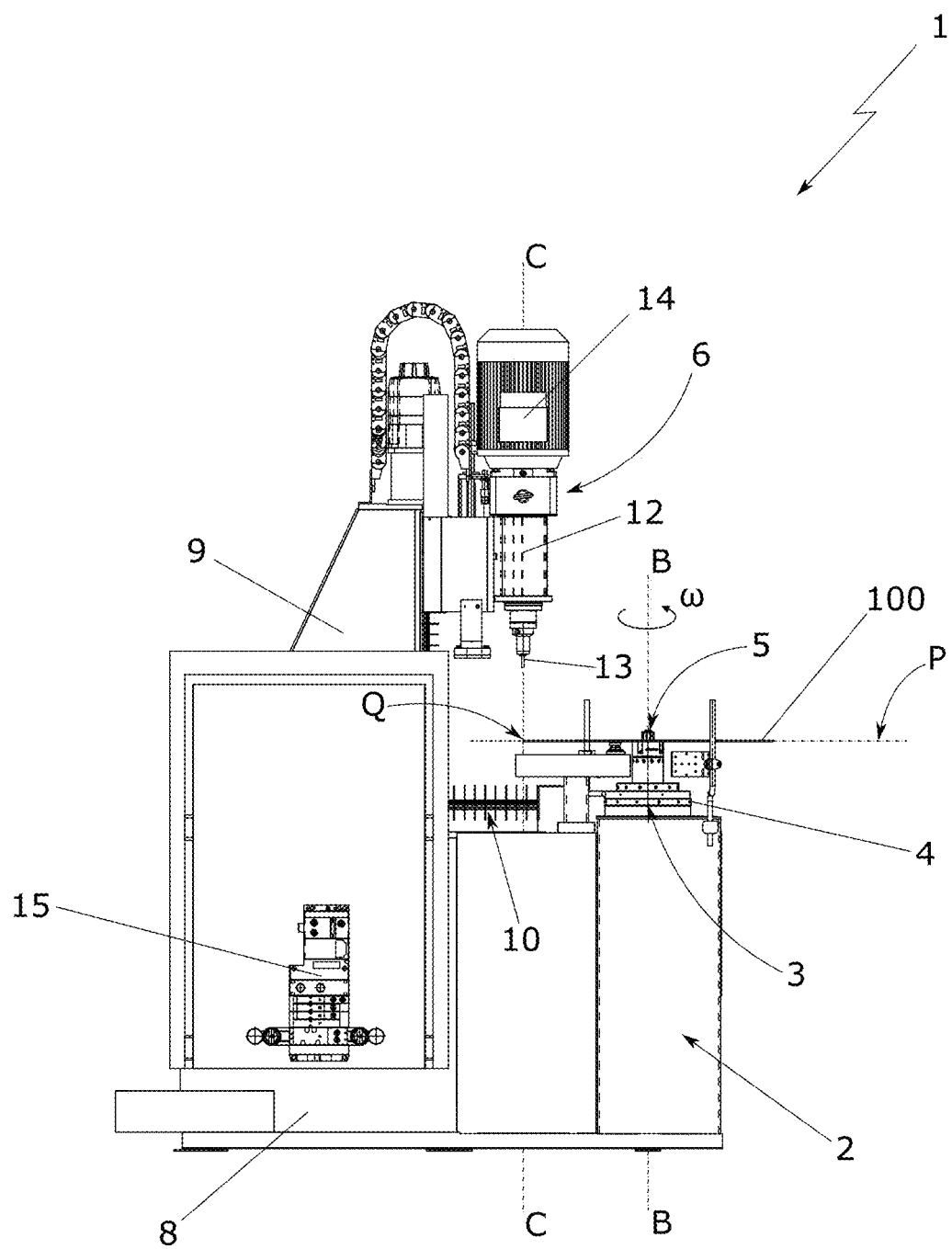
FIG. 2 is a lateral view of the disc-blade balancing machine shown in FIG. 1, with parts removed for clarity's sake.
Figure 3:
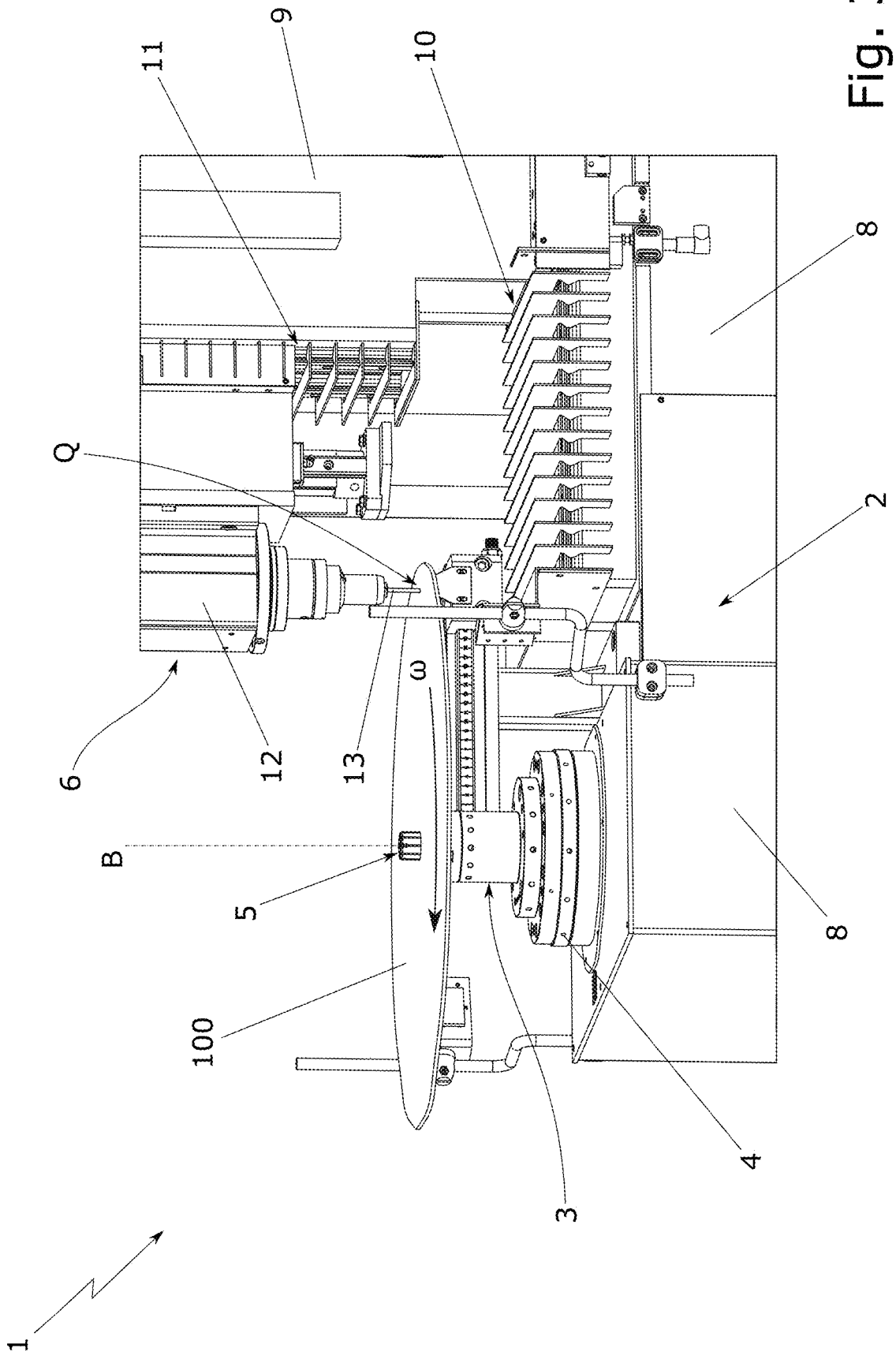
FIG. 3 is a perspective view, on a larger scale, of a part of the machine shown in FIG. 1, with parts removed clarity's sake.

With reference to FIGS. 1, 2 and 3, number 1 denotes, as a whole, a disc-blade balancing machine adapted to automatically balance a disc blade 100 preferably, though not necessarily, of the tipped teeth type.

More in detail, the machine 1 is adapted to make, in the disc blade 100, one or more transversal holes with predetermined dimensions, in an eccentric position relative to the central or main axis of the blade, i.e. in an eccentric position relative to the symmetry and rotation axis A of the blade.

The term "disc blade" indicates, in particular, a rotary circular tool adapted to cut panels preferably large-sized, which are made of wood, plastic and/or similar materials, and are not necessarily flat. In other words, the term "disc blade" identifies a rotary circular tool which is adapted to make straight cuts in said panels and is preferably suited to be installed in cutting machines, such as for example table saws, miter saws and/or the like.

Figure 5:
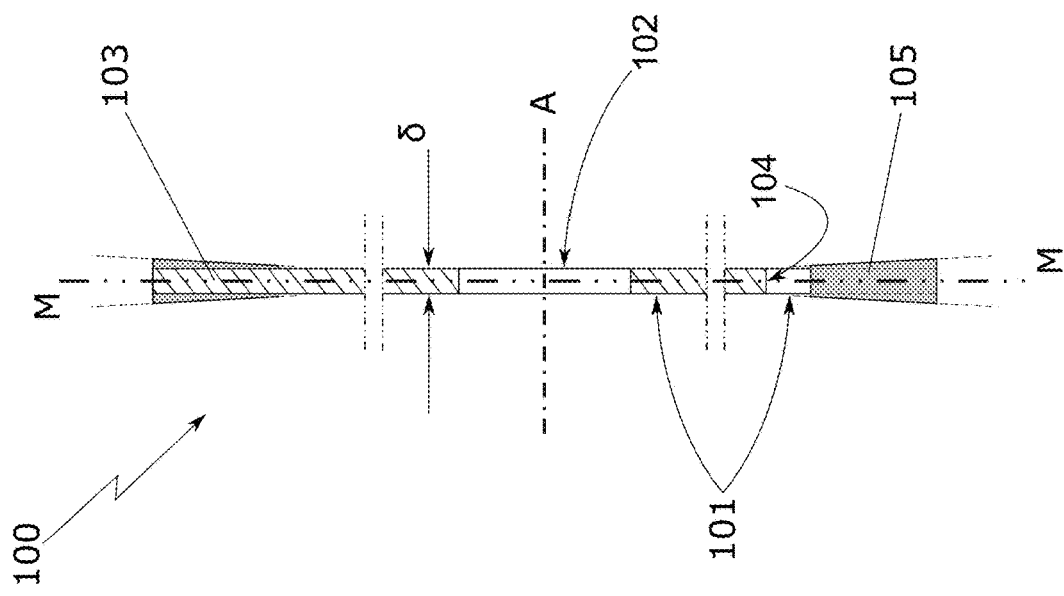
FIG. 5 is a lateral view of the disc blade shown in FIG. 4, sectioned along section line V-V and with parts removed clarity's sake.
Figure 4:
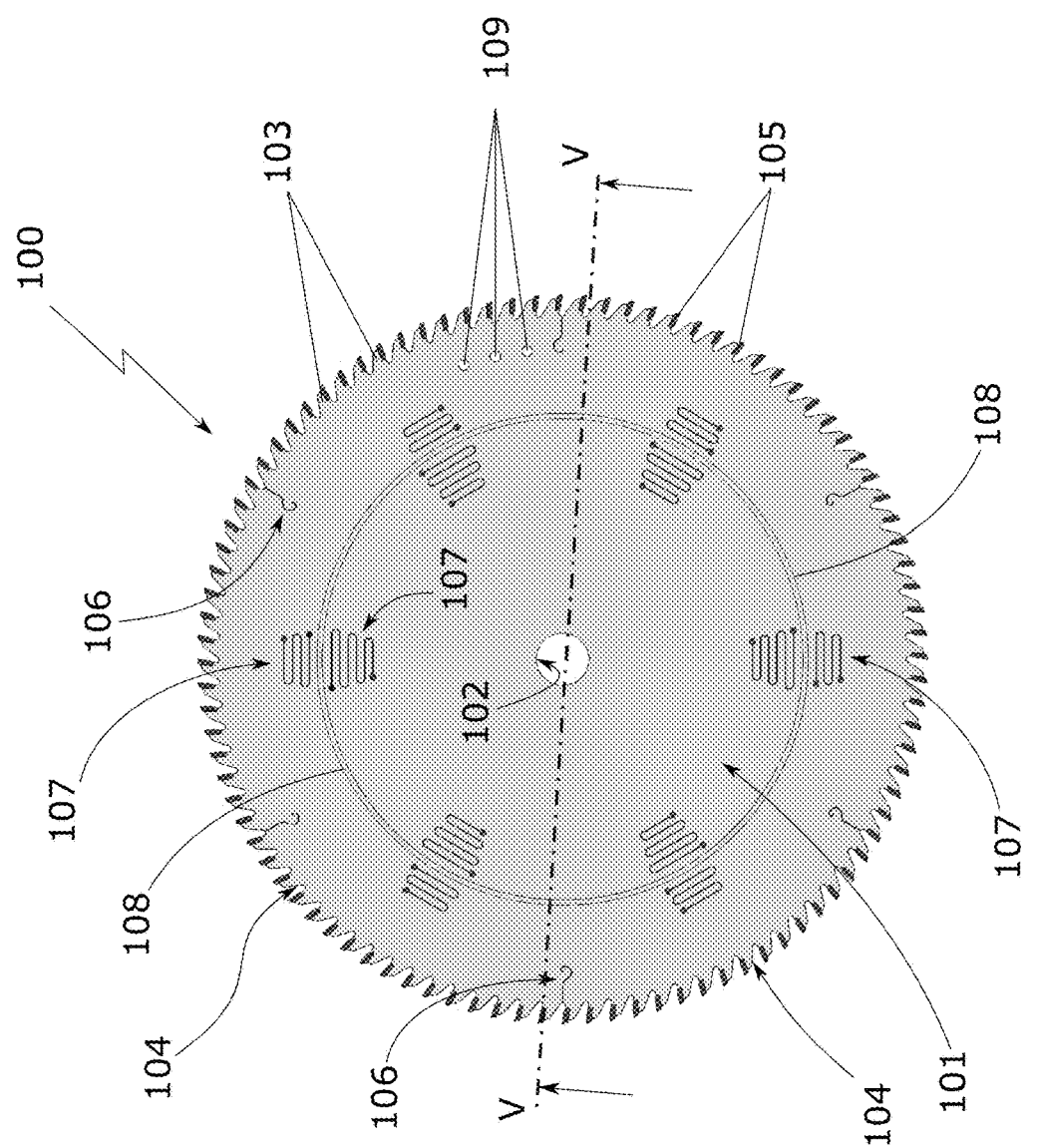

As shown in FIGS. 4 and 5, in particular, the disc blade 100 comprises: a central disc 101 preferably made of metal material, which extends coaxially to said symmetry and rotation axis A and is preferably provided with a central through hole 102 with a predetermined diameter; a series of protruding teeth 103 that jut out cantilevered from the perimeter edge 104 of central disc 101 in a substantially radial direction, and are spaced apart along the perimeter edge 104 preferably in a substantially regular manner; and, preferably, a series of tips or inserts 105 of high-resistance material, each of which is welded or brazed on the crest of a respective tooth 103 so as to form the cutting part of the same tooth 103.

More in detail, the central disc 101 is substantially flat, and the radial teeth 103 are preferably made in one piece with the central disc 101, and jut out cantilevered from the perimeter edge 104 of central disc 101 while remaining substantially coplanar to the midplane M of the disc, which, in turn, is substantially perpendicular to axis A. The radial teeth 103 define, together with the inserts 105, the toothed crown of disc blade 100.

The high-resistance material inserts 105, in turn, are preferably made of a high-resistance metal material and are fixed on the respective protruding teeth 103 preferably by welding or brazing, so as to be arranged astride the tooth midplane that, in turn, can coincide or not with the midplane M of central disc 101. Clearly, the inserts 105 can also be made of ceramic material, of a hybrid sintered material or the like, depending on the type of material they are going to cut.

In addition, the inserts 105 are preferably prismatic in shape with a substantially trapezoid or rectangular cross-section, and moreover they preferably have a minimum width measured perpendicularly to the midplane M, which is greater than the thickness δ of central disc 101, so that the lateral sides of each insert 105 protrude cantilevered from opposite sides of the central disc 101 and of the tooth 102.

In other words, the width of inserts 105 is such that, during cutting operations, only the inserts 105 come into contact with the piece/panel to be processed. On the contrary, the central disc 101 should never come into contact with the piece/panel to be processed during cutting operations.

The central hole 102 of the central disc 101, on the other hand, is coaxial to the symmetry and rotation axis A of the blade.

With reference to FIG. 4, moreover the central disc 101 is preferably provided with a plurality of preferably pass-through, peripheral openings or slits 106 which extend in a substantially radial direction insides the central disc 101, starting from the perimeter edge 104, and are specifically structured to allow/support local deformations of the blade toothed crown caused by temperature gradients generated during cutting.

More in detail, the peripheral slits 106 are preferably angularly equally spaced around the blade rotation axis A, and they preferably end into a hook-shaped segment.

In addition, the central disc 101 is preferably also provided with a plurality of preferably pass-through, inner slits 107 that are made in the central disc 101 at a given distance from the perimeter edge 104 and are specifically structured so as to damp the vibrations transmitted inside the central disc 101 during cutting operations.

More in detail, the inner slits 107 are preferably angularly equally spaced around the blade rotation axis A, and are preferably shaped like an S or a winding line.

Preferably the inner slits 107 are finally filled with a polymeric material preferably of elastomeric type, which is adapted to increase the vibration damping capacity of the inner slits 107.

With reference to FIG. 4, preferably the central disc 101 is moreover provided with one or more annular tensioning bands 108, which are made on central disc 101 preferably via rolling, are spaced from central hole 102 and from perimeter edge 104, and are adapted to locally stiffen the central disc 101 so as to reduce the twist and/or the vibrations of the disc blade 100 during cutting.

More in detail, the annular tensioning band or bands 108 are preferably located on the disc 101 at a distance from the blade rotation axis A preferably ranging between 50% and 75% of the value of the radius of central disc 101.

With reference to FIG. 4, finally the central disc 101 additionally has one or more balancing holes 109 that are preferably circular in shape, and are made in the body of central disc 101 in an eccentric position relative to the blade symmetry and rotation axis A, preferably along the periphery of the central disc 101.

Preferably, the eccentric balancing hole or holes 109 are moreover of a pass-through type and/or have a diameter lower than 15 mm (millimetres) and, more conveniently, also lower than 6 mm (millimetres).

Furthermore, the balancing holes 109 preferably have all substantially the same diameter.

With reference to FIG. 4, in addition, the eccentric balancing hole or holes 109 are preferably made close to the perimeter edge 104 of disc blade 100.

More in detail, the balancing holes 109 are preferably made in the annular portion of central disc 101 extending between the perimeter edge 104 and the annular tensioning band or bands 108.

In other words, the balancing hole or holes 109 are preferably made at a distance from rotation axis A greater than or equal to 50% of the radius of central disc 101.

More in detail, the balancing hole or holes 109 are preferably made at a distance from rotation axis A greater than or equal to 80% of the radius of central disc 101.

With reference to FIG. 4, moreover the balancing holes 109 are preferably adjacent to one another and/or substantially equidistant from rotation axis A.

Preferably, the balancing hole or holes 109 are finally made in the periphery of central disc 101, so that the distance of the balancing hole or holes 109 from the immediately adjacent peripheral slits 106 always exceeds a given limit, conveniently equal to 1.5 mm.

With reference to FIGS. 1, 2 and 3, the machine 1 is adapted to make, in the body of central disc 101, said balancing hole or holes 109 in one or more points of the disc periphery, so as to remove a quantity of material such as to balance the distribution of the masses of the disc blade 100 relative to the symmetry and rotation axis A of the blade.

Clearly, the number, dimension and/or position of the balancing holes 109 in the central disc 101, or rather in the periphery of central disc 101, depend/s on the initial position of the center of mass of the disc blade 100 relative to the symmetry and rotation axis A of the blade.

In other words, the number, dimension and/or position of the balancing holes 109 depend on the quantity of mass that needs to be removed from the central disc 101 in order to balance the disc blade 100 as best as possible.

More in detail, the number, dimension and/or position of the balancing holes 109 are determined so as to reduce and/or substantially eliminate the initial eccentricity of the center of mass of the disc blade 100 relative to rotation axis A.

Even more in detail, the number, dimension and/or position of the balancing holes 109 in the central disc 101, or rather in the periphery of central disc 101, are determined so as to bring the center of mass of disc blade 100 at a distance from the blade rotation axis A smaller than a predetermined maximum limit that is preferably function of the nominal or maximum rotation speed of the disc blade 100.

Preferably, said limit value is furthermore lower than 0.5 mm (millimetres) and, more conveniently, lower than or equal to 100 μm (micrometres), i.e. 0.1 mm.

More in detail, the number, dimension and/or position of the balancing holes 109 in the central disc 101, or rather in the periphery of central disc 101, are determined so that the residual unbalance of disc blade 100 calculated according to standard ISO 1940-1 falls within a given balancing grade (Gx) of standard ISO 1940-1.

In the example shown, in particular, the number, dimension and/or position of balancing holes 109 in the central disc 101 are preferably determined so that the residual unbalance of disc blade 100 calculated according to standard ISO 1940-1 falls within a G100 balancing grade or lower, or more conveniently G40 or lower of the same standard ISO 1940-1.

Clearly, the balancing hole or holes 109 are made in the portion/sector of central disc 101 where there is, at beginning, an excess material that causes the unbalance. In addition, the balancing hole or holes 109 could also be blind holes, i.e. they could have a depth smaller than the thickness δ of central disc 101.

In other words, some balancing holes 109 in central disc 101 can be blind holes and other balancing holes 109 can be through holes.

With reference to FIGS. 1, 2 and 3, the disc-blade balancing machine 1 firstly comprises a self-supporting rigid structured 2, which is preferably made of metal material and is adapted to stably rest on and optionally be firmly anchored to the ground.

The disc-blade balancing machine 1 additionally comprises: a blade-holder spindle 3, which is fixed to the rigid structure 2 with the capability of freely rotating about a preferably substantially vertical, rotation axis B, and is adapted to support and rigidly lock the disc blade 100 while arranging it substantially coaxial to axis B, on a laying plane P perpendicular to the same axis; a preferably electrically-operated, motor assembly (not shown in the figures), which is adapted to drive the blade-holder spindle into rotation about the axis B, preferably up to a predetermined angular speed ω; and an electronic detection device 4 that is located on the blade-holder spindle 3 and is adapted to detect a possible unbalance of the disc blade 100 fitted on the blade-holder spindle 3.

More in detail, the electronic detection device 4 is adapted to detect and quantify the state of eccentricity of the center of mass of the disc blade 100 relative to the rotation axis B.

In other words, the electronic detection device 4 is adapted to detect the angular position of the center of mass of the disc blade 100 relative to a fixed reference and the distance of the center of mass of the disc blade 100 relative to rotation axis B.

In addition, the machine 1 is preferably also provided with an angular position transducer (not visible in the figures) which is fitted on the blade-holder spindle 3 and is adapted to detect, in real time, the angular position of the blade-holder spindle 3 relative to said fixed reference.

The motor assembly, in turn, is preferably structured so that it can vary, on command, the angular position of the blade-holder spindle 3 relative to the above-mentioned fixed reference.

With reference to FIG. 3, in the example shown, in particular, the blade-holder spindle 3 is preferably provided with a preferably hydraulically- or pneumatically-operated, expansion locking head 5 which is adapted to fit and expand, on command, into the central hole 102 of disc blade 100, so as to lock the disc blade 100 in rigid manner to the blade-holder spindle 3, aligning at the same time the rotation axis A of the disc blade 100 to the rotation axis B of the blade-holder spindle 3.

The electronic detection device 4, on the other hand, preferably comprises a plurality of force transducers (not visible in the figures), which are adapted to measure the centrifugal force that the disc blade 100 temporarily fitted on the blade-holder spindle 3 transmits to the blade-holder spindle 3 when it is driven into rotation about the rotation axis B.

More in detail, the electronic detection device 4 is preferably provided with a plurality of piezoelectric accelerometers or similar sensors, which are grouped in one or more detection sets located along rotation axis B. The piezoelectric accelerometers of the or of each detection set are distributed around the blade-holder spindle 3, on a same laying plane substantially perpendicular to axis B.

The use of a single set of sensors allows to detect the static unbalance of disc blade 100. The use of two or more sets of sensors spaced along the rotation axis B allows to also detect the dynamic unbalance of disc blade 100.

With reference to FIGS. 1, 2 and 3, the disc-blade balancing machine 1 furthermore comprises: a preferably electrically-operated, drilling assembly 6 that is fixed to the rigid structure 2 beside the blade-holder spindle 3 and, preferably, also on a side of the laying plane P, with the capability of moving from and towards the laying plane P, so as to be able to reach and pierce, on command, the disc blade 100 temporarily fitted on the blade-holder spindle 3; and a preferably electrically-operated, moving assembly that is adapted to move, on command, the drilling assembly 6 from and towards the laying plane P so that the drilling assembly 6 can reach and pierce the disc blade 100 temporarily fitted on the blade-holder spindle 3.

More in detail, the drilling assembly 6 is preferably fixed on the rigid structure 2 above the laying plane P and, optionally, also in an eccentric position relative to the spindle rotation axis B.

Clearly, the drilling assembly 6 could also be located beneath the laying plane P.

The drilling assembly 6, in addition, is preferably fixed on the rigid structure 2 so as to be able to move in straight manner from and towards the laying plane P in a given direction transversal to the laying plane P and, more conveniently, perpendicular to the laying plane P.

Hence, the drilling assembly 6 is adapted to reach/intersect the laying plane P in one single predetermined point Q of the plane, so as to drill the disc blade 100 temporarily fitted on the blade-holder spindle 3 only in said point Q.

More in detail, with reference to FIGS. 1, 2 and 3, the rigid structure 2 preferably comprises: a horizontal base 8, on which the blade-holder spindle 3 is located; and a bearing column 9 that rises cantilevered from the base 8 parallel to the axis B, i.e. in a substantially vertical direction, beside the blade-holder spindle 3, and is fixed to the base 8 with the capability of moving from and towards the blade-holder spindle 3 in a direction $d_1$ substantially perpendicular to axis B, i.e. substantially horizontal, preferably while remaining always parallel to itself.

In addition, the machine 1 is preferably also provided with a first, preferably electrically- or hydraulically-operated, actuator device 10 that is capable of moving, on command, the bearing column 9 from and towards the blade-holder spindle 3 in the direction $d_1$, so as to vary/adjust the distance of the bearing column 9 from the axis B.

The laying plane P is preferably located above the base 8, and the drilling assembly 6 is preferably fixed cantilevered on the bearing column 9, with the capability of moving along the bearing column 9, i.e. in a direction $d_2$ parallel to axis B, from and towards the base 8 and the laying plane P immediately above it.

In addition, the machine 1 is preferably also provided with a second, preferably electrically- or hydraulically-operated, actuator device 11 that is capable of moving, on command, the drilling assembly 6 along the bearing column 9, in the direction $d_2$, from and towards the base 8 and/or the laying plane P, so as to bring the drilling assembly 6 into contact with the disc blade 100 temporarily fitted on the blade-holder spindle 3.

With reference to FIGS. 1, 2 and 3, preferably the drilling assembly furthermore comprises 6: a rotary tool-holder spindle 12, which is firmly fixed to the rigid structure 2, or rather to the bearing column 9, with the capability of freely moving in the direction $d_2$, and is adapted to receive and rigidly lock a drill bit 13 or other material removing tool; and a preferably electrically-operated, motor assembly 14 that is adapted to drive the tool-holder spindle 12 into rotation about its rotation axis C.

More in detail, the tool-holder spindle 12 is adapted to receive and rigidly lock the drill bit 13 or other similar tool, while placing the tool, or rather the drill bit 13, locally coaxial to the spindle rotation axis C and locally parallel to the direction $d_2$, i.e. parallel to axis B.

With reference to FIGS. 1 and 3, additionally the disc-blade balancing machine 1 also comprises: an electronic control device 15 which is adapted to drive/command the motor assembly of blade-holder spindle 3 and the moving apparatus of the drilling assembly 6 as a function of the data detected by the electronic detection device 4; and preferably also an electronic blade-measuring device which is adapted to detect and communicate to the electronic control device 15 the diameter of the disc blade 100 temporarily fitted on the blade-holder spindle 3.

More in detail, the electronic blade-measuring device is preferably located beside the blade-holder spindle 3, and is adapted to detect the diameter of the central disc 101 of the disc blade 100 temporarily fitted onto the blade-holder spindle 3.

The electronic control device 15 is adapted to command/control the motor assembly of the blade-holder spindle 3 so as to drive the blade-holder spindle 3 into rotation about the rotation axis B, and/or so as to vary the angular position of the blade-holder spindle 3 relative to said fixed reference, in order to vary/change the angular position of the disc blade 100 temporarily fitted onto the blade-holder spindle 3.

Furthermore, the electronic control device 15 is adapted to drive/command the moving apparatus of the drilling assembly 6 so as to bring the drilling assembly 6 into contact with the disc blade 100 temporarily fitted onto the blade-holder spindle 3. Preferably, the electronic control device 15 is moreover adapted to drive/command the moving apparatus of drilling assembly 6 also as a function of the data coming from said electronic blade-measuring device.

More in detail, the electronic control device 15 is provided with a data processing unit, which is adapted to determine/calculate, based on the data coming from the electronic detection device 4 and, optionally, also on the data coming from said electronic blade-measuring device, the position of the point or points of disc blade 100 where the balancing hole or holes 109 have to be made. In addition, the electronic control device 15 is adapted to also drive/command the motor assembly of blade-holder spindle 3 and the moving apparatus of drilling assembly 6 so as to make said balancing hole or holes 109 in the disc blade 100 temporarily fitted on the blade-holder spindle 3.

Even more in detail, the electronic control device 15 is preferably programmed/configured to drive/command the motor assembly of blade-holder spindle 3 based on the signals coming from said angular position transducer, so as to align, time after time, a predetermined point of the disc blade 100 to the drilling assembly 6, or rather to the drill bit 13.

Preferably, the electronic control device 15 is moreover programmed/configured so as to automatically reject the disc blade 100 fitted on the blade-holder spindle 3 in case the number and/or the dimensions of the balancing holes 109 to be made exceed a predetermined limit threshold.

In addition, the electronic control device 15 is preferably adapted to also drive/command the first actuator device 10 so as to move, on command, the bearing column 9 from and towards the blade-holder spindle 3 in the direction $d_1$. Furthermore, the electronic control unit 15 is preferably adapted to also drive/command the actuator device 11 so as to move, on command, the drilling assembly 6 along the bearing column 9, in the direction $d_2$, from and towards the base 8 and/or the laying plane P.

More in detail, the electronic control device 15 is preferably programmed/configured to drive/command the actuator device 10 based on the signals coming from one or more linear position transducers that are suitably located on the base 8 and/or on the column 9.

Similarly, the electronic control device 15 is preferably programmed/configured to drive/command the actuator device 11 based on the signals coming from one or more linear position transducers that are suitably located on the column 9 and/or on drilling assembly 6.

Preferably, the electronic control device 15 is furthermore adapted to also drive/command the motor assembly 14 of drilling assembly 6.

The operation of machine 1 will be described below, assuming that the disc blade 100 to be balanced has already been fitted onto the blade-holder spindle 3.

The balancing method implemented by the machine 1 comprises the steps of:
- determining the initial position of the center of mass of the disc blade 100 to be balanced with respect to the rotation axis A;
- calculating/determining the number, the position and/or the dimensions of one or more balancing holes 109 eccentric with respect to the rotation axis A and necessary for removing an amount of material sufficient to bring the center of mass of the disc blade 100 at a distance from rotation axis A smaller than a predetermined maximum limit value; and
- making said balancing hole or holes 109 in the central disc 101 in an eccentric position with respect to rotation axis A.

Clearly, the number, position and/or dimensions (i.e. the diameter and/or the depth of the hole) of the eccentric balancing hole or holes 109 depend on the quantity of material that needs to be removed from the central disc 101 of disc blade 100 in order to bring the center of mass of the disc blade 100 in the neighbourhood of rotation axis A. In addition, the balancing hole or holes 109 can be blind holes of through holes.

Preferably, said maximum limit value is furthermore lower than 0.5 mm (millimetres) and, more conveniently, lower than or equal to 100 μm (micrometres), so as to fall within the G100 balancing grade of standard ISO 1940-1 or, more conveniently, within the G40 balancing grade or lower of standard ISO 1940-1.

Preferably, the balancing method implemented by the machine 1 additionally comprises the step of automatically rejecting the disc blade 100 fitted on the blade-holder spindle 3 in case the number and/or the dimensions of eccentric balancing holes 109 to be made exceed a predetermined limit threshold.

In addition, the step of determining the initial position of the center of mass of disc blade 100 preferably comprises the steps of:
bringing the disc blade 100 to be balanced into rotation about its symmetry and rotation axis A; and
determining the state/degree of initial eccentricity (angular position of the center of mass relative to the fixed reference and distance of the center of mass from the rotation axis A, B) of the center of mass of the disc blade 100.

Preferably, the step of bringing the disc blade 100 to be balanced into rotation about the rotation axis A furthermore comprises the steps of:
rigidly locking the disc blade 100 to be balanced onto the blade-holder spindle 3 of the machine, so that the rotation A axis of the disc blade 100 is substantially coincident with the rotation axis B of the blade-holder spindle 3; and
driving into rotation the blade-holder spindle 3 so as to bring the disc blade 100 into rotation about the rotation axis B.

Preferably, the disc blade 100 is furthermore driven into rotation by the blade-holder spindle 3 up to a given angular speed ω, preferably greater than or equal to 400 rpm (revolutions per minute).

In addition, after having made the balancing hole or holes 109, the balancing method implemented by the machine 1 preferably also comprises the step of driving the disc blade 100 again into rotation about rotation axis A, so as to check whether the center of mass of the disc blade 100 is at a distance from rotation axis A smaller than said maximum limit value.

Preferably, on the other hand, the step of making one or more balancing holes 109 comprises the steps of:
activating the drilling assembly 6, or rather activating the motor assembly 14, so as to drive the tool-holder spindle 12 and the drill bit 13 into rotation about the axis C; and
commanding/controlling the moving apparatus of drilling assembly 6, or rather the actuator devices 10 and 11, so as to make the balancing hole or holes 109 in the disc blade 100 fitted onto the blade-holder spindle 3.

More in detail, the step of making the balancing hole or holes 109 in the central disc 101 of disc blade 100 preferably comprises the steps of:
stopping the blade-holder spindle 3 in a first previously-calculated angular position, so as to align a first pre-determined point of the central disc 101 to the drilling assembly 6, or rather to the drill bit 13; and
commanding/controlling the moving apparatus of drilling assembly 6, or rather the actuator devices 10 and 11, so as to make the first balancing hole 109 in said first predetermined point of the central disc 101.

In addition, in case a plurality of balancing holes 109 are needed for bringing the center of mass of disc blade 100 at a distance from rotation axis A smaller than said maximum limit value, the balancing method implemented by the machine 1 preferably additionally comprises, after having made the first balancing hole 109, the steps of:
bringing the blade-holder spindle 3 to a second/further previously-calculated angular position, so as to align a second/further point of the central disc 101 to the drilling assembly 6, or rather to the drill bit 13; and
commanding/controlling the moving apparatus of drilling assembly 6, or rather the actuator devices 10 and 11, so as to make the second or further balancing hole 109 in said second/further point of the central disc 101.

Obviously, the balancing method implemented by the machine 1 entails repeating the steps listed above until the previously calculated number of balancing holes 109 is reached.

Clearly, the balancing of the disc blade can take place before and/or after the possible application of the tips or inserts 105 onto the teeth 103 of the disc blade 100.

The advantages connected to the use of the disc-blade balancing machine 1 described above and with the balancing method implemented by it are remarkable.

First of all, the machine 1 makes the balancing of disc blades quicker and more economic, since it removes from central disc 101, in a quick and completely automatic manner, the exact quantity of material needed to bring the center of mass of the blade in the neighbourhood of the rotation axis A.

In addition, the machine 1 does not require the correct balancing of the blade to be checked after every single material removal operation.

Furthermore, the machine 1 minimizes production waste because it calculates in advance and in a precise manner the number, position and/or dimensions of the balancing holes 109 to be made in the central disc 101 in order to balance the disc blade 100, thus eliminating the risk of having to reject disc blades 100 at the end, due to an excess material removal.

The disc blade balancing method described above, in addition, does not require the presence of trained operators.

It is finally clear that modifications and variants can be made to the disc-blade balancing method and to the machine 1 described above without however departing from the scope of protection of the present invention.

For example, in a different not-shown embodiment, the eccentric balancing holes 109 could have a different cross section, such as for example an oval, elliptical, rectangular or similar cross section.

In this case, the drill bit 13 would be replaced by a mill.

The invention claimed is:

1. A method for balancing of disc blades which are adapted to rotate about a given main axis and which comprise a central disc and a series of protruding teeth jutting out cantilevered from the perimeter edge of the central disc, said method comprising the steps of:
determining the initial position of the center of mass of the disc blade to be balanced with respect to said main axis;
undertaking one of the steps of calculating and determining at least one of the number, the position, and the dimensions of at least one balancing hole eccentric with respect to said main axis to develop an indication of at least one of an amount of material to be removed from the disc blade sufficient to bring the center of mass of the disc blade-to a distance from the main axis less than a predetermined maximum limit value; and forming said at least one balancing hole on the central disc in an eccentric position with respect to said main axis;

wherein the step of determining the initial position of the center of mass of the disc blade-comprises the steps of:

rigidly locking the disc blade to be balanced on a blade-holder spindle rotatable about a spindle rotation axis so that the main axis of the disc blade is coincident with the spindle rotation axis;

driving the blade-holder spindle into rotation about the spindle rotation axis so as to bring the disc blade into rotation about said main axis; and determining at least one of the state and degree of initial eccentricity of the center of mass of the disc blade; and wherein the step of forming said at least one balancing hole on the central disc comprises the steps of:

stopping the blade-holder spindle at least in a first previously-calculated angular position so as to align a predetermined first point of the central disc to a drilling assembly; and undertaking one of the steps of driving and commanding a moving apparatus of the drilling assembly so as to form, at said predetermined first point of the central disc, a balancing hole that extends parallel to said main axis.

2. Method for balancing of disc blades according to claim 1, wherein the step of forming said at least one balancing hole on the central disc comprises the steps of:

bringing the blade-holder spindle into a further previously-calculated angular position so as to align a second/further point of the central disc to said drilling assembly; and driving/commanding said moving apparatus of the drilling assembly so as to form a further balancing hole at said further point of the central disc.

3. Method for balancing of disc blades according to claim 1, wherein said maximum limit value is such that a residual unbalancing of the disc blade calculated according to the ISO 1940-1 standard falls within the G100 or lower balancing grade of the ISO 1940-1 standard.

4. Method for balancing of disc blades according to claim 1, wherein each of said at least one balancing hole is one of a blind hole and pass-through hole.

5. Method for balancing of disc blades according to claim 1, wherein each of said at least one balancing hole are formed on the periphery of the central disc.

6. Method for balancing of disc blades according to claim 5, wherein each of said at least one balancing hole is formed at a distance from said main axis greater than 50% of the radius of the central disc.

7. Method for balancing of disc blades according to claim 1, wherein each said balancing hole is circular.

8. Method for balancing of disc blades according to claim 7, wherein a plurality of balancing holes is formed in the disc blade and wherein said balancing holes all have the same diameter.

9. Method for balancing of disc blades according to claim 7, wherein each of said at least one balancing hole has a diameter of less than 15 mm.

10. Method for balancing of disc blades according to claim 1, wherein a plurality of balancing holes is formed in the disc blade and wherein said balancing holes are disposed at least at one of positions adjacent to another balancing hole and at positions equidistant from the blade main axis.

11. A machine for balancing of disc blades, comprising: a ground-resting and self-supporting rigid structure; a blade-holder spindle which is fixed to the rigid structure with the capability of freely rotating about a rotation axis, and is adapted to support and rigidly lock a disc blade arranging it coaxial to the rotation axis on a laying plane perpendicular to said rotation axis; a motor assembly which is adapted to drive the blade-holder spindle into rotation about the rotation axis; an electronic detecting device which is located on the blade-holder spindle and is adapted to detect the unbalancing of the disc blade engaged on the blade-holder spindle; a drilling assembly which is fixed to the self-supporting rigid structure beside the blade-holder spindle, with the capability of moving from and towards said laying plane in a direction parallel to said rotation axis; and a moving apparatus which is adapted to move, on command, the drilling assembly from and towards said laying plane so that the drilling assembly can reach and pierce the disc blade temporarily fitted on the blade-holder spindle, in order to form one or more balancing holes on said disc blade.

12. Machine for balancing of disc blades according to claim 11, additionally comprising an electronic control device which is adapted to undertake at least one of commanding and driving the motor assembly of the blade-holder spindle and the moving apparatus of the drilling assembly as a function of the data detected by said electronic detecting device.

13. Machine for balancing of disc blades according to claim 12, wherein the electronic control device is adapted to undertake at least one of commanding and driving the motor assembly of the blade-holder spindle so as to undertake at least one of driving the blade-holder spindle into rotation about its rotation axis and varying the angular position of the blade-holder spindle with respect to a fixed reference.

14. Machine for balancing of disc blades according to claim 12, wherein the electronic control device is provided with a data processing unit which is adapted to undertake one of determining and calculating, based on the data gathered by the electronic detecting device, the position of at least one of the points of the disc blade where the at least one balancing hole is to be made.

15. Machine for balancing of disc blades according to claim 14, wherein the electronic control device is then adapted to undertake at least one of commanding and driving the motor assembly of the blade-holder spindle and the moving apparatus of the drilling assembly so as to make said at least one balancing hole on the disc blade temporarily fitted on the blade-holder spindle.

16. A disc blade adapted to rotate about a central axis thereof and comprising a central disc and a series of protruding teeth jutting out cantilevered from the perimeter edge of the central disc;

said disc blade being additionally comprising at least one balancing hole that is formed on the central disc in an eccentric position with respect to said central axis and extends parallel to the central axis wherein the at least one balancing hole has a diameter no greater than one of 15 millimeters and 6 millimeters.

17. A disc blade according to claim 16, wherein said at least one balancing hole is formed at a distance from said central axis greater than 50% of a radius of the central disc.

* * * * *